No. 722,534. PATENTED MAR. 10, 1903.
J. NICHOLAS.
EXTENSION FRAME FOR FRUIT BOXES.
APPLICATION FILED OCT. 14, 1902.

NO MODEL.

Witnesses
Chas. F. Clagett
Chas. H. Davids

Inventor
Joseph Nicholas,
By his Attorney, J. R. Littell

UNITED STATES PATENT OFFICE.

JOSEPH NICHOLAS, OF GUTTENBERG, NEW JERSEY.

EXTENSION-FRAME FOR FRUIT-BOXES.

SPECIFICATION forming part of Letters Patent No. 722,534, dated March 10, 1903.

Application filed October 14, 1902. Serial No. 127,217. (No model.)

*To all whom it may concern:*

Be it known that I, JOSEPH NICHOLAS, a subject of the King of Belgium, residing at Guttenberg, in the county of Bergen and State of New Jersey, have invented certain new and useful Improvements in Extension-Frames for Fruit-Boxes, &c., of which the following is a specification.

This invention relates to display-boxes for merchandise, the object being to provide a box-cover adapted to take the place of the permanent cover of any box once the former has been removed for access to the contents and one which, while being practically dust and air tight after being put in position, may be readily adjusted both longitudinally and laterally to adapt it to fit boxes of different sizes and be interchangeable therewith.

The invention comprises a frame consisting of telescopic sections flanged to adapt them to fit over a box or crate of any size within the limits of the adjustability of the frame and a correspondingly adjustable cover hinged to the frame.

The invention is especially designed for use upon tea and coffee boxes and other boxes and crates for merchandise, but of course is not restricted in its use to any particular class of boxes.

Figure 1:
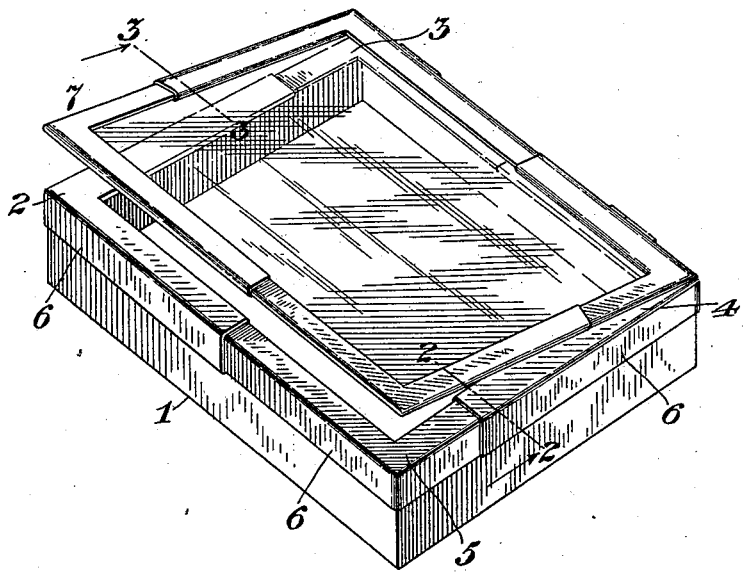
Figure 2:
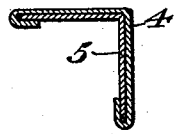
Figure 3:

In the accompanying drawings, which show the preferred embodiment of the invention, Figure 1 is a view in perspective of the improvement, showing the cover in raised position. Fig. 2 is a section on the line 2 2 of Fig. 1, and Fig. 3 is a section on the line 3 3 of Fig. 1.

Corresponding parts in all the figures are denoted by the same reference characters.

The reference-numeral 1 designates a box of the usual rectangular form to which is applied a frame consisting of four right-angular sections 2, 3, 4, and 5, each having a depending annular flange 6. The four sections are connected together telescopically by edge flanges on the sections 2 and 4, overlapping the adjacent sections 3 and 5. The cover 7 is hinged to one side of the frame and is composed of four telescoping corner-sections capable of both longitudinal and lateral adjustment.

The sections of the cover are bent to provide grooves 8 to receive a glass cover to protect the contents of the box and yet leave the same visible without lifting the cover.

The improvement is especially adapted for use in displaying teas, coffees, and other merchandise, and the utility of the device in its adaptation to boxes of varying size will be readily understood and appreciated.

While the construction shown in the drawings is simple and effective, I would have it understood that the invention includes all such variations and modifications as may fall within the terms and scope of the following claims.

Having thus described my invention, I claim and desire to secure by Letters Patent—

1. A box or crate attachment, comprising a longitudinally and laterally adjustable frame adapted to fit upon the box, in the plane of the top edges thereof, and a cover hinged to said frame and comprising corner-sections telescopically connected, so as to be mutually and correspondingly adjustable with said frame, substantially as set forth.

2. A box or crate attachment, comprising a rectangular frame consisting of telescopically-connected sections flanged to adapt them to fit over the box, and a rectangular cover consisting of telescopically-connected corner-sections provided with glass-retaining grooves, hinged to said frame and adapted to be correspondingly adjustable therewith, substantially as set forth.

3. A box or crate attachment comprising a frame consisting of telescopically-connected and relatively adjustable corner-sections rectangularly flanged to fit over the box, and a similarly-adjustable cover hinged to one side of the frame and consisting of corner-sections connected together telescopically and bent to form glass-retaining grooves around their inner edges, substantially as set forth.

In testimony whereof I have signed my name in the presence of the subscribing witnesses.

JOSEPH NICHOLAS.

Witnesses:
   F. O. MCCLEARY,
   J. C. PYBAS.